United States Patent
Mori et al.

(10) Patent No.: US 8,720,809 B2
(45) Date of Patent: May 13, 2014

(54) SEAT BELT RETRACTOR AND SEAT BELT APPARATUS

(75) Inventors: Takahiro Mori, Tokyo (JP); Daisuke Murakami, Tokyo (JP); Koji Tanaka, Tokyo (JP); Takaaki Kimura, Tokyo (JP)

(73) Assignee: Takata Corporation, Tokyo (JP)

( * ) Notice: Subject to any disclaimer, the term of this patent is extended or adjusted under 35 U.S.C. 154(b) by 624 days.

(21) Appl. No.: 13/018,302

(22) Filed: Jan. 31, 2011

(65) Prior Publication Data

US 2011/0193395 A1 Aug. 11, 2011

(30) Foreign Application Priority Data

Feb. 5, 2010 (JP) ................................. 2010-023938

(51) Int. Cl.
*B60R 22/46* (2006.01)
(52) U.S. Cl.
USPC ........................................... 242/374; 242/390
(58) Field of Classification Search
CPC .............. B60R 22/46; B60R 2022/468; B60R 2022/4666
USPC ................... 242/374, 390, 394, 394.1, 382.5, 242/383.4–383.5, 384.2
See application file for complete search history.

(56) References Cited

U.S. PATENT DOCUMENTS

| 7,392,959 B2 * | 7/2008 | Inuzuka et al. ............ 242/390.9 |
| 7,823,679 B2 * | 11/2010 | Takao et al. ................... 180/268 |
| 2005/0098672 A1 * | 5/2005 | Tanaka et al. .............. 242/390.8 |
| 2011/0017857 A1 * | 1/2011 | Odate ........................... 242/374 |

FOREIGN PATENT DOCUMENTS

| JP | 2005-28970 A | 2/2005 |
| JP | 2005-53422 A | 3/2005 |
| JP | 2008-30668 A | 2/2008 |
| JP | 2008-179260 A | 8/2008 |
| JP | 2008-280010 A | 11/2008 |

* cited by examiner

*Primary Examiner* — Sang Kim
(74) *Attorney, Agent, or Firm* — Foley & Lardner LLP (57) ABSTRACT

Provided are a seat belt retractor and a seat belt apparatus, which can reduce the emanation of abutment noise upon switching of a clutch. A first embodiment of a seat belt retractor according to the present invention includes a spool for retracting a webbing W to restrain an occupant, a motor for generating drive torque to rotate the spool, a power transmission means for transmitting the drive torque of the motor to the spool, a clutch for connecting or disconnecting the power transmission means and the spool, and a casing for housing the clutch and the power transmission means. The clutch has a pawl rotatably connected to the casing, an actuating pin for rotating the pawl in conjunction with the power transmission means, and a stopper portion for limiting the rotation of the actuating pin.

6 Claims, 5 Drawing Sheets

SEAT BELT RETRACTOR AND SEAT BELT APPARATUS

FIELD OF THE INVENTION

The present invention relates to a seat belt retractor and a seat belt apparatus mounted on a vehicle such as an automobile, and more specifically, it relates to a seat belt retractor and a seat belt apparatus having a motor for retracting a webbing.

BACKGROUND OF THE INVENTION

In a vehicle such as an automobile, generally, a seat having a seat portion for seating an occupant and a back portion located behind the occupant is provided with a seat belt apparatus for restraining the occupant. Such a seat belt apparatus has a webbing for restraining the occupant, a seat belt retractor for retracting the webbing, a guide anchor provided on the vehicle body side to guide the webbing, a belt anchor for fixing the webbing to the vehicle body side, a buckle disposed on the side of the seat, and a tongue disposed on the webbing, and restrains the occupant by inserting the tongue into the buckle. In such a seat belt apparatus, one end of the webbing is fixed to the belt anchor, and the other end of the webbing is passed through the guide anchor and connected to the seat belt retractor.

In general, the seat belt retractor has a spool for retracting the webbing to restrain the occupant, and the spool is always urged in the retracting direction by a power spring. When the elastic force of such a power spring is large, there are some problems such as a large resistance during withdrawal of the webbing and a discomfort feeling during wearing the seat belt. On the other hand, when the elastic force of the power spring is small, the withdrawn webbing is difficult to retract. Now, a seat belt retractor provided with a motor to assist the retracting of the webbing has already been proposed (see, for example, Japanese Unexamined Patent Application Publication Nos. 2005-53422 and 2008-280010). In such a motorized seat belt retractor, when the distance between vehicles becomes smaller than a predetermined distance, the motor is sometimes controlled so that it repeatedly pulls the webbing in order to send a signal to the occupant.

As described in Japanese Unexamined Patent Application Publication Nos. 2005-53422 and 2008-280010, a motorized seat belt retractor is generally provided with a clutch for switching between a state where the drive torque of the motor is transmitted to the spool and a state where the drive torque of the motor is not transmitted to the spool. In the invention described in Japanese Unexamined Patent Application Publication No. 2008-280010, there is provided an operating noise reduction means for preventing the emanation of abutment noise between a pawl (clutch member) and a stopper member upon switching of the clutch.

SUMMARY OF THE INVENTION

However, when a pawl (clutch member) is stopped by a stopper member as in the above-described invention described in Japanese Unexamined Patent Application Publication No. 2008-280010 and the members coming into contact with each other are made of metal, there are the following problems. Even in the case of point contact or line contact, no small abutment noise emanates easily. Due to the weight of the pawl (clutch member), the pawl (clutch member) is easily accelerated, and therefore the abutment noise tends to be large.

The present invention is made in view of the above-described problems, and an object of the present invention is to provide a seat belt retractor and a seat belt apparatus that can reduce the emanation of abutment noise upon switching of the clutch.

The present invention provides a seat belt retractor including a spool for retracting a webbing to restrain an occupant, a motor for generating drive torque to rotate the spool, a power transmission means for transmitting the drive torque of the motor to the spool, a clutch for connecting or disconnecting the power transmission means and the spool, and a casing for housing the clutch and the power transmission means. The clutch has a pawl rotatably connected to the casing, an actuating pin for rotating the pawl in conjunction with the power transmission means, and a stopper portion for limiting the rotation of the actuating pin.

The present invention provides a seat belt apparatus including a webbing for restraining an occupant, a seat belt retractor for retracting the webbing, a guide anchor provided on the vehicle body side to guide the webbing, a belt anchor for fixing the webbing to the vehicle body side, a buckle disposed on the side of the seat, and a tongue disposed on the webbing. The apparatus restrains the occupant with the webbing in the seat by inserting the tongue into the buckle. The seat belt retractor includes a spool for retracting the webbing to restrain the occupant, a motor for generating drive torque to rotate the spool, a power transmission means for transmitting the drive torque of the motor to the spool, a clutch for connecting or disconnecting the power transmission means and the spool, and a casing for housing the clutch and the power transmission means. The clutch has a pawl rotatably connected to the casing, an actuating pin for rotating the pawl in conjunction with the power transmission means, and a stopper portion for limiting the rotation of the actuating pin.

In the above-described seat belt retractor and seat belt apparatus according to the present invention, the stopper portion comprises, for example, a protruding portion formed on the casing, a protruding member disposed on the casing, or a rod-like member disposed in the casing.

The actuating pin or the stopper portion may have a buffer portion on the surface thereof. The buffer portion is made, for example, of a material that reduces the emanation of abutment noise upon contact with the actuating pin and can be used in a temperature range of −40° C. to 80° C.

In the above-described seat belt retractor and seat belt apparatus according to the present invention, the actuating pin abuts the stopper portion to stop the rotation of the pawl, whereby the pawl does not contact with the casing, reducing the emanation of abutment noise upon switching of the clutch. In general, the actuating pin is more lightweight and has lower rigidity than the pawl and has elastic force, reducing more the emanation of noise when the actuating pin abuts the stopper portion than when the pawl abuts the stopper portion.

In addition, when the stopper portion is defined by a protruding portion formed on the casing, the stopper portion can be formed without using a separate part, thus allowing a seat belt retractor with the reduced abutment noise to be manufactured easily and inexpensively. Even when the stopper portion is formed using a separate part (a protruding member or a rod-like member), a seat belt retractor with the reduced abutment noise can be easily manufactured, and, in addition, the degree of freedom of shape and arrangement can be improved.

By forming a buffer portion on the surface of the actuating pin or the stopper portion, the abutment noise can be further reduced. In particular, by making the buffer portion of a material that reduces the abutment noise and is excellent in resistance to environment, the abutment noise can be effectively reduced, and the damage and deterioration of the buffer portion can be reduced even under severe use conditions of an automobile or the like.

BRIEF DESCRIPTION OF THE DRAWINGS

FIG. 1 shows a first embodiment of a seat belt retractor according to the present invention, wherein FIG. 1A is a main configuration diagram and FIG. 1B is an enlarged view of the surroundings of a clutch.

FIG. 2 is an operation explanatory view of the clutch, wherein

FIG. 3 shows other embodiments of seat belt retractors according to the present invention, wherein FIG. 3A shows a second embodiment.

DETAILED DESCRIPTION OF THE PREFERRED EMBODIMENTS

Figures 1, 1A:
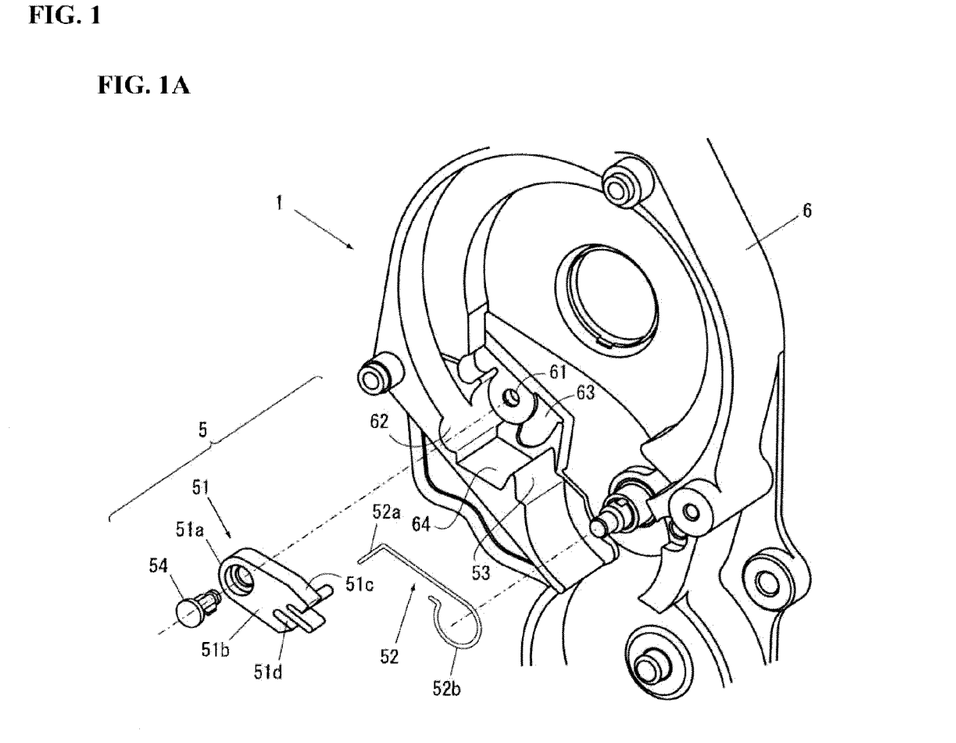
Figure 1B:
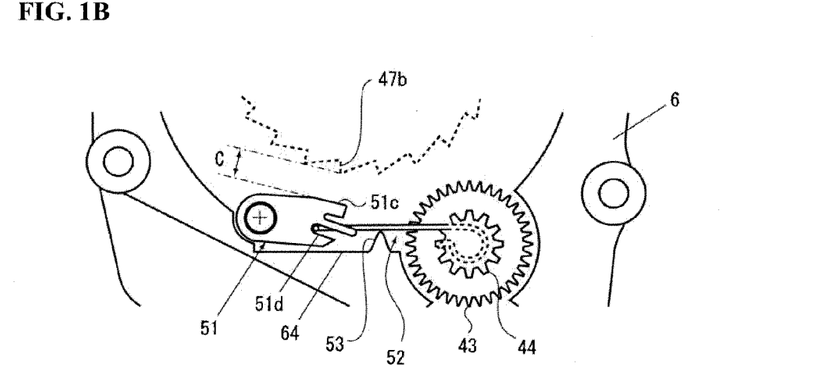
Figure 2A:
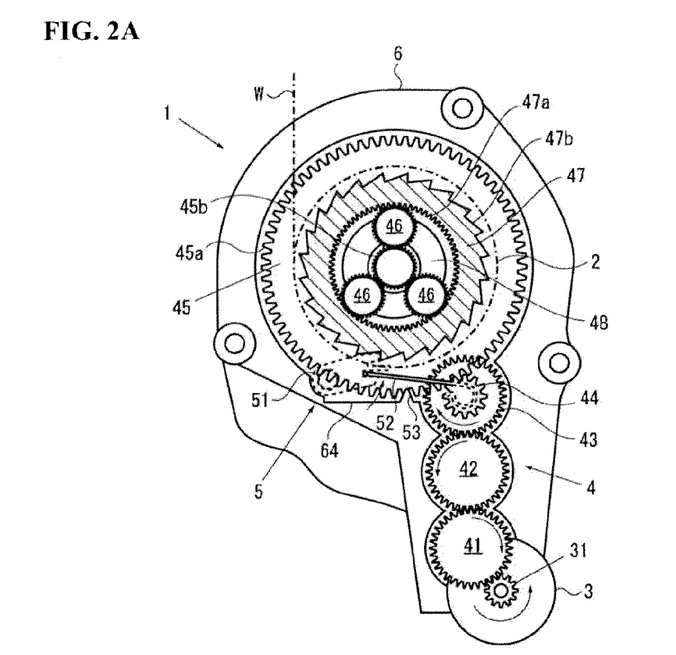
FIG. 2A shows an engaged state and FIG. 2B shows a disengaged state.
Figure 2B:
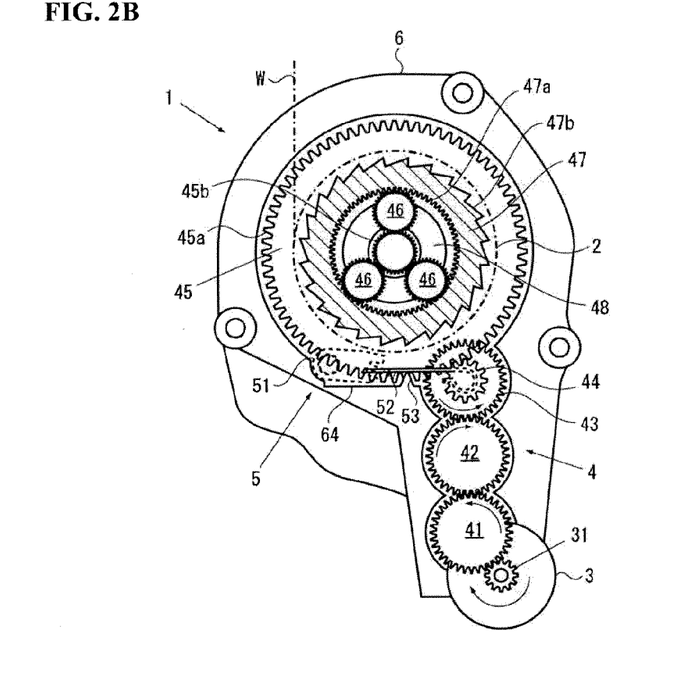

The embodiments of the present invention will now be described with reference to FIGS. 1 to 5. FIG. 1 shows a first embodiment of a seat belt retractor according to the present invention, wherein FIG. 1A is a main configuration diagram and FIG. 1B is an enlarged view of the surroundings of a clutch. FIG. 2 is an operation explanatory view of the clutch, wherein FIG. 2A shows an engaged state and FIG. 2B shows a disengaged state. In FIG. 1, parts, such as a spool, a motor, and a power transmission means, that construct a seat belt retractor are omitted.

As shown in FIGS. 1 and 2, a first embodiment of a seat belt retractor 1 according to the present invention includes a spool 2 for retracting a webbing W to restrain an occupant, a motor 3 for generating drive torque to rotate the spool 2, a power transmission means 4 for transmitting the drive torque of the motor 3 to the spool 2, a clutch 5 for connecting or disconnecting the power transmission means 4 and the spool 2, and a casing 6 for housing the clutch 5 and the power transmission means 4. The clutch 5 has a pawl 51 rotatably connected to the casing 6, an actuating pin 52 for rotating the pawl 51 in conjunction with the power transmission means 4, and a stopper portion 53 for limiting the rotation of the actuating pin 52.

The pawl 51 is connected to the casing 6 using a pawl pin 54 as shown in FIG. 1. The pawl pin 54 is a part for rotatably retaining the pawl 51 in a retaining hole 61 of the casing 6. The pawl pin 54 may be a separate part such as that shown, or may be a shaft portion formed integrally with the casing 6.

The pawl 51 has a pin retaining portion 51a having a recessed portion housing the pawl pin 54 and a through hole, and a main body portion 51b extending from the pin retaining portion 51a in one direction. The pin retaining portion 51a is formed in such a shape that its outer circumference forms a part of a cylinder, and is configured so as to be fit in a fitting portion 62 formed inside the wall portion of the casing 6. The main body portion 51b has a pawl portion 51c that engages with a ratchet 47b connected to the spool 2, and an engaging groove 51d that engages with the actuating pin 52.

As shown in FIG. 1B, the pawl portion 51c is formed at the leading edge of the main body portion 51b, and has a shape corresponding to the shape of the teeth of the ratchet 47b. The engaging groove 51d is formed in such a shape that an engaging portion 52a formed at the leading edge of the actuating pin 52 can be inserted into and engaged with it. Therefore, the pawl 51 corresponds one-to-one to the actuating pin 52. When the actuating pin 52 rotates, the engaging portion 52a contacts with the engaging groove 51d and rotates the pawl 51. The actuating pin 52 may be rotated by the cogging torque of the motor 3, since the actuating pin 52 is rotated by the power of the motor 3 as will be described later. By providing a sufficient gap C between the pawl portion 51c and the ratchet 47b, the pawl 51 is disposed at such a position that the pawl portion 51c does not engage with the ratchet 47b even when the actuating pin 52 is rotated by the cogging torque. The configuration of the pawl 51 is not limited to that shown. Various changes may be made depending on conditions such as the installation space and the shape of the casing 6. For example, the pawl 51 may have an engaging hole instead of the engaging groove 51d. An initial spring may be disposed that always urges the pawl 51 in such a direction that the clutch is disengaged.

The actuating pin 52 has, as shown in FIG. 1, a substantially L-shaped engaging portion 52a formed at the front end, and a substantially circular hook portion 52h formed at the back end. The leading edge of the engaging portion 52a is formed in the same direction as the rotation axis of the pawl 51. The hook portion 52b is fitted on the shaft portion of the power transmission means 4 formed in the same direction as the rotation axis of the pawl 51. Therefore, by inserting the engaging portion 52a into the engaging groove 51d of the pawl 51, when the hook portion 52b is rotated along the shaft portion of the power transmission means 4, the engaging portion 52a contacts with the engaging groove 51d and rotates the pawl 51.

The stopper portion 53 comprises, for example, a protruding portion formed on the casing 6, as shown in FIG. 1. The stopper portion 53 is formed at such a position that it can contact with the intermediate portion of the actuating pin 52. The height of the protruding portion that forms the stopper portion 53 is set to at least such a height that the pawl 51 does not contact with a side portion 64 of the casing 6 when the actuating pin 52 contacts with the stopper portion 53, of course taking into account the flexure due to elasticity of the actuating pin 52. The protruding portion that forms the stopper portion 53 is molded integrally with the casing 6, and can be easily molded, for example, by just changing the shape of the die for molding the casing 6. The protruding portion that forms the stopper portion 53 may have any shape, for example, a triangular shape, a rectangular shape, or a spherical shape, as long as it can stop the actuating pin 52.

Next, the outline of the overall configuration of the seat belt retractor 1 and the operation of the clutch 5 will be described with reference to FIGS. 2A and 2B. The configuration of the seat belt retractor 1 is basically the same as that of the conventional seat belt retractor except for the above-described clutch 5 (particularly, the stopper portion 53) and is not limited to the shown configuration (see, for example, Japanese Unexamined Patent Application Publication Nos. 2005-53422 and 2008-280010).

The spool 2 is a retracting drum for retracting the webbing W. The casing 6 is disposed along the side of the spool 2, and the power transmission means 4 and the clutch 5 are housed in the casing 6. In FIG. 2, only the inner casing of the casing 6 is shown, and the outer casing thereof is omitted.

The power transmission means 4 is a gear train for transmitting the power of the motor 3 to the spool 2. To the drive shaft of the motor 3 is connected a drive gear 31. To the drive gear 31, a first intermediate gear 41, a second intermediate gear 42, and a third intermediate gear 43 are connected so as to mesh in order. The first intermediate gear 41, the second intermediate gear 42, and the third intermediate gear 43 are rotatably connected to the casing 6. A fourth intermediate gear 44 is disposed coaxially with and rotates in conjunction with the third intermediate gear 43. The number of the intermediate gears arranged in the power transmission means 4 is not limited to the number of the intermediate gears shown in the figure, one or some of which may be omitted.

The fourth intermediate gear 44 is configured to mesh with external teeth 45*a* of a sun gear member 45 and to transmit the power to the sun gear member 45. The sun gear member 45 has, in the central part thereof, a drive shaft coaxial with the external teeth 45*a* and protruding toward the casing 6. Internal teeth 45*b* of the sun gear member 45 are formed on the circumference of the drive shaft. The internal teeth 45*b* form a sun gear. Planetary gears 46 are disposed on the circumference of the internal teeth 45*b*. An internal gear 47 is disposed around the planetary gears 46 and has internal teeth 47*a* meshing with each planetary gear 46. The above-described ratchet 47*b* is formed on the circumference of the internal gear 47. The planetary gears 46 are connected to a carrier 48 through a reduction plate (not shown) and a reduction pin (not shown) so as to revolve around the sun gear (internal teeth 45*b*) and to rotate, thus constructing a so-called reduction mechanism. The carrier 48 is connected to the rotating shaft of the spool 2 and configured so as to finally transmit the power to the spool 2. Although not shown, outside the casing 6 (outer casing) is disposed a power spring (not shown) that urges the spool 2 in the retracting direction.

The clutch 5 has, as described above, an actuating pin 52 for rotating the pawl 51 in conjunction with the power transmission means 4. The actuating pin 52 is connected to the power transmission means 4 by fitting the hook portion 52*b* on the shaft of the third intermediate gear 43. The actuating pin 52 rotates in conjunction with the third intermediate gear 43 when the load on the actuating pin 52 is low, and only the third intermediate gear 43 rotates under a predetermined load, since the actuating pin 52 is connected to the shaft of the third intermediate gear 43 by the elastic force of the hook portion 52*b*. Therefore, by controlling the rotation direction of the third intermediate gear 43, the rotation direction of the actuating pin 52 can be controlled and consequently the rotation direction of the pawl 51 can be controlled.

For example, in order to bring the clutch 5 into the engaged state shown in FIG. 2A, the motor 3 is driven to rotate the drive gear 31 counterclockwise in the figure thereby causing the first intermediate gear 41 to rotate clockwise in the figure, the second intermediate gear 42 to rotate counterclockwise in the figure, and the third intermediate gear 43 to rotate clockwise in the figure. Thus, the actuating pin 52 rotates clockwise in the figure thereby causing the pawl 51 to rotate counterclockwise in the figure and the pawl portion 51*c* of the pawl 51 to mesh with the ratchet 47*b*. As a result, the ratchet 47*b* becomes unable to rotate clockwise in the figure. The spool 2 also becomes unable to rotate clockwise in the figure because the ratchet 47*b* is connected to the rotating shaft of the spool 2. That is to say, the webbing W retracted on the spool 2 becomes unable to be withdrawn.

On the other hand, in order to bring the clutch 5 into the disengaged state shown in FIG. 2B, the motor 3 is driven to rotate the drive gear 31 clockwise in the figure thereby causing the first intermediate gear 41 to rotate counterclockwise in the figure, the second intermediate gear 42 to rotate clockwise in the figure, and the third intermediate gear 43 to rotate counterclockwise in the figure. Thus, the actuating pin 52 rotates counterclockwise in the figure thereby causing the pawl 51 to rotate clockwise in the figure and the pawl portion 51*c* of the pawl 51 to disengage from the ratchet 47*b*. As a result, the ratchet 47*b* becomes able to rotate clockwise in the figure. The spool 2 also becomes able to rotate clockwise in the figure. The webbing W becomes able to be freely withdrawn.

As shown in FIG. 2A, in the engaged state of the clutch 5, the actuating pin 52 is disposed at a position distant from the stopper portion 53 formed on the casing 6. In the disengaged state of the clutch 5, as shown in FIG. 2B, the actuating pin 52 rotates toward the side portion 64 of the casing 6 and contacts with the stopper portion 53. The pawl 51 is configured not to contact with the side portion 64 of the casing 6 at this time. The actuating pin 52 is generally made of wire, is lightweight and has low rigidity and elastic force, reducing more the emanation of noise when the actuating pin 52 abuts the stopper portion 53 than when the pawl 51 abuts the casing 6. Therefore, the stopper portion 53 according to the present invention prevents the pawl 51 from contacting with the casing 6, and can reduce the emanation of abutment noise upon switching of the clutch.

Figures 3, 3A:
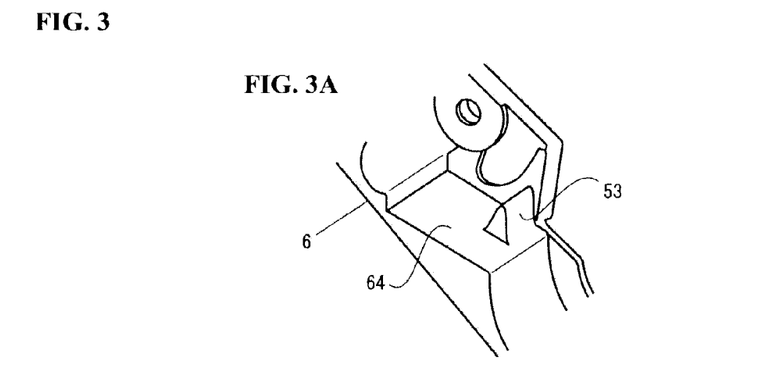
Figure 3B:
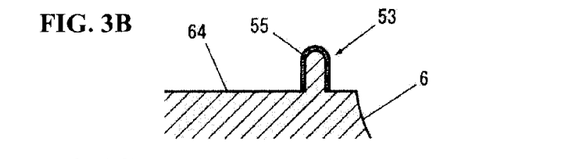
FIG. 3B shows a third embodiment.
Figure 3C:
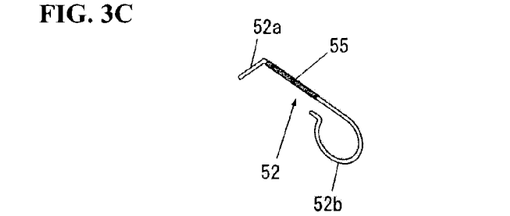
FIG. 3C shows a fourth embodiment.
Figure 3D:
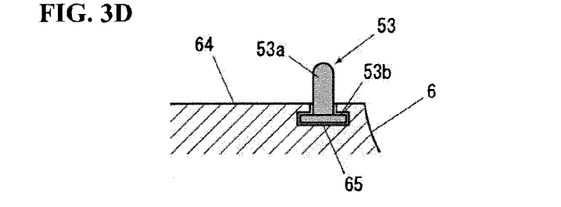
FIG. 3D shows a fifth embodiment.
Figure 3E:
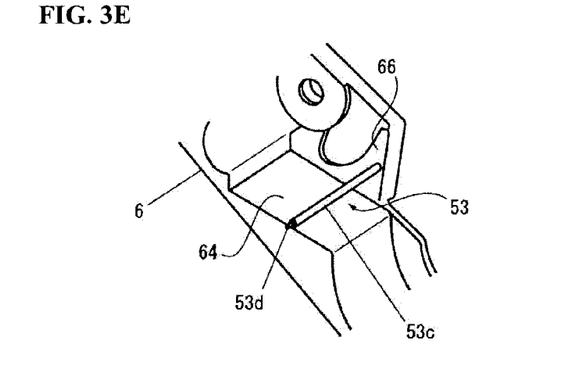
FIG. 3E shows a sixth embodiment.

Next, other embodiments of seat belt retractors 1 according to the present invention will be described. FIG. 3 shows other embodiments of seat belt retractors according to the present invention, wherein FIG. 3A shows a second embodiment, FIG. 3B shows a third embodiment, FIG. 3C shows a fourth embodiment, FIG. 3D shows a fifth embodiment, and FIG. 3E shows a sixth embodiment. The same reference numerals will be used to designate the same parts as those in the first embodiment shown in FIG. 1, and redundant description will be omitted.

In the second embodiment shown in FIG. 3A, a stopper portion 53 is formed in a part of the side portion 64 of the casing 6. Thus, a stopper portion 53 may be formed partially according to the position of the actuating pin 52.

In the third embodiment shown in FIG. 3B, a buffer portion 55 is formed on the surface of a stopper portion 53. Thus, the abutment noise can be further reduced by forming a buffer portion 55. The buffer portion 55 is made of a material that reduces the emanation of abutment noise upon contact with the actuating pin 52 and can be used in a temperature range of −40° C. to 80° C. Specifically, resin material such as urethane resin is suitable as such a material. However, materials such as ceramics, rubber, and a metal having high ductility will suffice. The buffer portion 55 is formed on the surface of the stopper portion 53 by means of, for example, adhesion, vapor deposition, welding, thermal spraying, or attachment. When the buffer portion 55 comprises a separate part (buffer member), the buffer portion 55 can be easily formed just by adhering or attaching the buffer member to the stopper portion 53. When the buffer portion 55 is integral with the stopper portion 53, the number of parts can be reduced.

In the fourth embodiment shown in FIG. 3C, a buffer portion 55 is formed on the actuating pin 52. When a buffer portion 55 is formed on the actuating pin 52, the abutment noise can also be further reduced. Unlike the stopper portion 53 formed on the casing 6, the actuating pin 52 is a separate part and is therefore easy to handle, and the buffer portion 55 can be easily formed. The material and method of forming the buffer portion 55 are the same as those in the case of the third embodiment.

In the fifth embodiment shown in FIG. 3D, a stopper portion 53 comprises a part separate from the casing 6. That is to say, a stopper portion 53 comprises a protruding member disposed on the casing 6. The stopper portion 53 has a protruding portion 53a that protrudes from the side portion 64 of the casing 6, and a flange portion 53b formed at the lower end thereof. The stopper portion 53 is fixed to the casing 6, for example, by inserting the flange portion 53b into an emplacement groove 65 formed in the casing 6. When the stopper portion 53 comprises a separate part, the stopper portion 53 may be made of the same material as the casing 6 or the buffer portion 55, or may have a buffer portion 55 formed on the surface thereof.

In the sixth embodiment shown in FIG. 3E, a stopper portion 53 comprises a rod-like member disposed in the casing 6. The stopper portion 53 has a rod-like portion 53c disposed between the wall portions 66 of the casing 6, and protruding portions 53d formed at both ends of the rod-like portion 53c. The stopper portion 53 is fixed to the casing 6, for example, by inserting the protruding portions 53d into recessed portions or through-holes formed in the casing 6. The rod-like member may be made of the same material as the casing 6 or the buffer portion 55, or may have a buffer portion 55 formed on the surface thereof. The rod-like portion 53c may be formed integrally with the wall portions 66.

Figure 4:
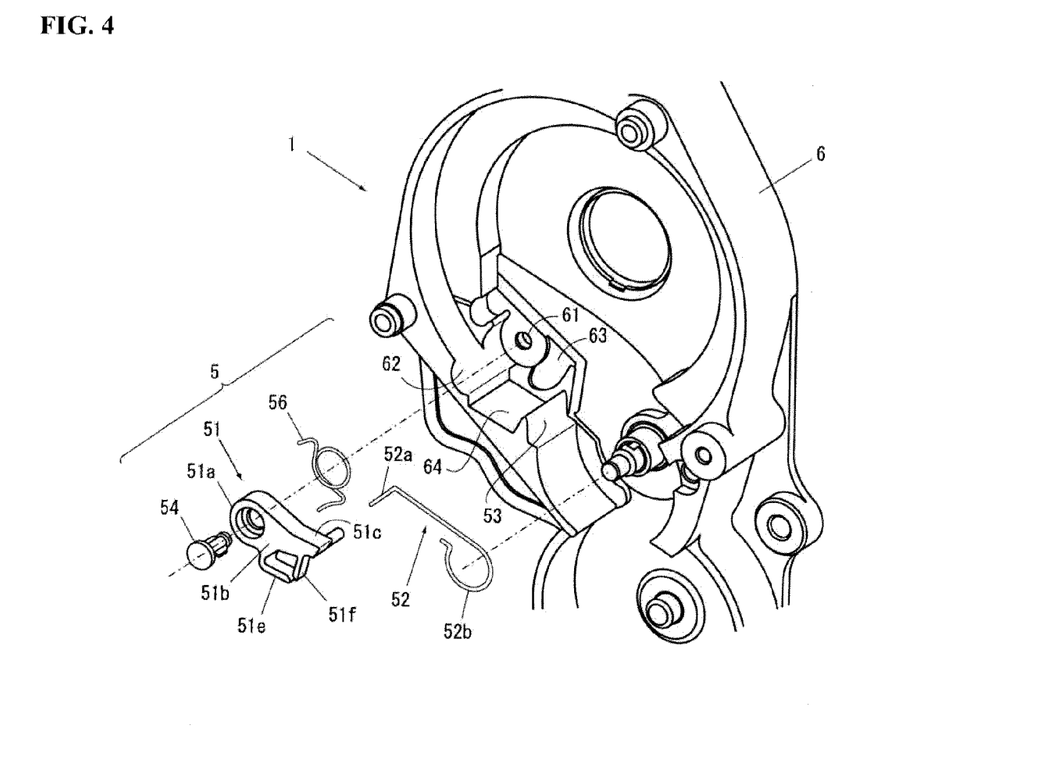
FIG. 4 shows a modification of the first embodiment shown in FIG. 1.

Next, a modification of the seat belt retractor 1 shown in FIG. 1 will be described. FIG. 4 shows a modification of the first embodiment shown in FIG. 1. The same reference numerals will be used to designate the same parts as those in the first embodiment, and redundant description will be omitted.

The modification of the first embodiment shown in FIG. 4 is a modification of the configuration of the pawl 51 shown in FIG. 1. In this modification, a pawl 51 has a pin retaining portion 51a having a recessed portion housing a pawl pin 54 and a through hole, and a main body portion 51b extending from the pin retaining portion 51a in one direction. The main body portion 51b has a pawl portion 51c that engages with a ratchet 47b connected to the spool 2, an engaging groove 51d that engages with the actuating pin 52, a first extended portion 51e extending substantially parallel to the pawl portion 51c, and a second extended portion 51f extending substantially perpendicular to the pawl portion 51c. The first extended portion 51e and the second extended portion 51f are, as shown, extended so as to form a predetermined space in the main body portion 51b, and a gap is formed between the leading edges thereof. The actuating pin 52 is inserted through this gap into the space formed by the first extended portion 51e and the second extended portion 51f. Thus, the actuating pin 52 is loosely engaged with the pawl 51, thereby absorbing the togging torque of the motor 3. The pawl 51 may be provided with an initial spring 56 for always urging it in a direction away from the ratchet 47b (i.e., such a direction that the clutch is disengaged). The initial spring 56 allows the clutch to be immediately disengaged in accordance with the rotation of the actuating pin 52 without the engaging portion 52a of the actuating pin 52 contacting with the first extended portion 51e of the pawl 51.

Figure 5:
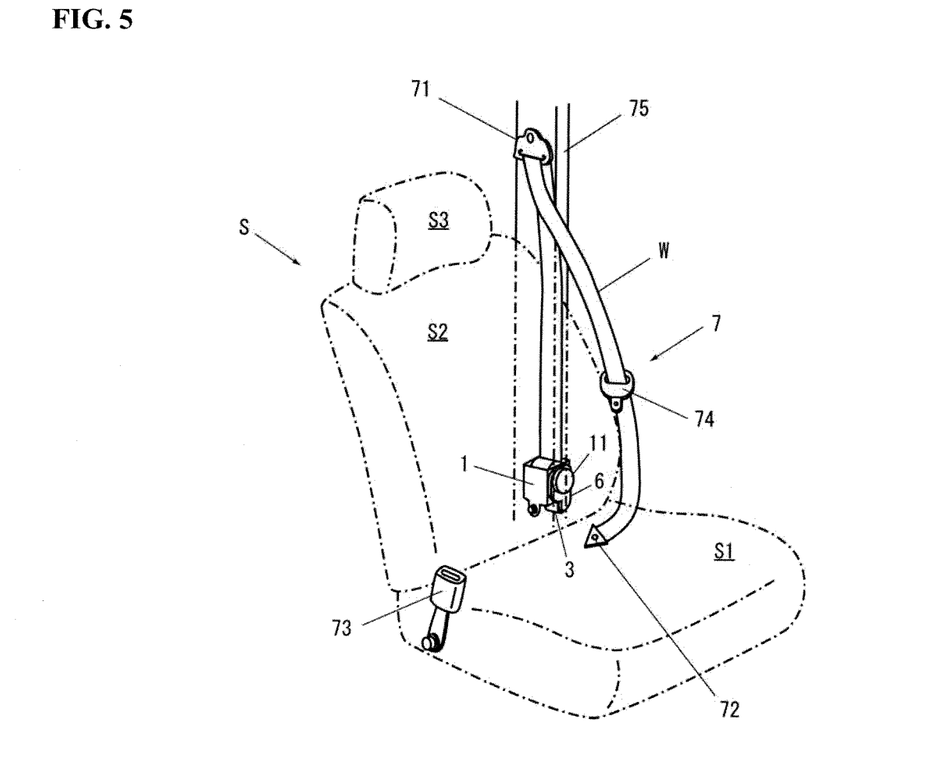
FIG. 5 is an overall configuration diagram showing a seat belt apparatus according to the present invention.

Finally, a seat belt apparatus 7 according to the present invention will be described. FIG. 5 is an overall configuration diagram showing a seat belt apparatus according to the present invention. The same reference numerals will be used to designate the same parts as those in the first embodiment shown in FIGS. 1 and 2, and redundant description will be omitted.

The seat belt apparatus 7 of the present invention shown in FIG. 5 includes a webbing W for restraining an occupant, a seat belt retractor 1 for retracting the webbing W, a guide anchor 71 provided on the vehicle body side to guide the webbing W, a belt anchor 72 for fixing the webbing W to the vehicle body side, a buckle 73 disposed on the side of the seat S, and a tongue 74 disposed on the webbing W. The apparatus restrains the occupant with the webbing W in the seat S by inserting the tongue 74 into the buckle 73. The seat belt retractor 1 includes a spool 2 for retracting the webbing W to restrain the occupant, a motor 3 for generating drive torque to rotate the spool 2, a power transmission means 4 for transmitting the drive torque of the motor 3 to the spool 2, a clutch 5 for connecting or disconnecting the power transmission means 4 and the spool 2, and a casing 6 for housing the clutch 5 and the power transmission means 4. The clutch 5 has a pawl 51 rotatably connected to the casing 6, an actuating pin 52 for rotating the pawl 51 in conjunction with the power transmission means 4, and a stopper portion 53 for limiting the rotation of the actuating pin 52.

The seat belt apparatus 7 according to the present invention is such a seat belt apparatus that the above-described seat belt retractor 1 according to the present invention is applied to a so-called normal seat belt apparatus. Therefore, the present invention provides a seat belt apparatus 7 with the reduced operation noise (abutment noise) of the clutch 5. Not only the seat belt retractor shown in the first embodiment but also the seat belt retractors shown in the second to sixth embodiments, various combinations of the first to sixth embodiments, the modification of the first embodiment, and the like can be applied to the seat belt retractor 1.

The seat S has, for example, a seat portion S1 for seating an occupant, a back portion S2 located behind the occupant, and a head rest portion S3 for supporting the head of the occupant. The seat belt retractor 1 is placed, for example, in a B pillar 75 of the vehicle body. In general, the buckle 73 is disposed on the side of the seat portion S1, and the belt anchor 72 is disposed on the undersurface of the seat portion S1. The guide anchor 71 is generally disposed on the B pillar 75 of the vehicle body. One end of the webbing W is connected to the belt anchor 72, and the other end thereof is connected to the seat belt retractor 1 through the guide anchor 71.

Therefore, when the tongue 74 is inserted into the buckle 73, the webbing W is withdrawn from the seat belt retractor 1 while sliding through the hole of the guide anchor 71. When the occupant wears the seat belt or undoes the seat belt to get out of the vehicle, the webbing W is retracted by the action of a power spring 11 or the motor 3 of the seat belt retractor 1 until a predetermined load is reached.

When the webbing W is retracted by the motor 3, as shown in FIG. 2A, the motor 3 is driven to rotate the drive gear 31 counterclockwise in the figure. The action of the power transmission means 4 (the first intermediate gear 41 to the fourth intermediate gear 44) causes the sun gear member 45 to rotate counterclockwise in the figure, and the internal teeth 45b to rotate counterclockwise in the figure. At this time, each planetary gear 46 tries to rotate clockwise in the figure and tries to rotate the internal gear 47 clockwise in the figure. However, as shown in FIG. 2A, the driving of the motor 3 cause the pawl 51 to rotate counterclockwise in the figure and the pawl portion 51c of the pawl 51 to mesh with the ratchet 47b, bringing the clutch 5 into an engaged state. As a result, the internal gear 47 cannot rotate clockwise in the figure. Therefore, each planetary gear 46 revolves around the internal teeth 45b counterclockwise in the figure. Because the planetary gears 46 are connected to the rotation shaft of the spool 2 by the carrier 48, the spool 2 rotates counterclockwise in the figure in conjunction with the revolution of the planetary gears 46, thereby retracting the webbing W.

After that, when a predetermined tension is applied on the webbing W or the webbing W is retracted by a predetermined length, the clutch 5 is disengaged to stop the retracting of the webbing W. When the retracting of the webbing W is stopped by the motor 3, as shown in FIG. 2B, the motor 3 is driven to rotate the drive gear 31 clockwise in the figure. Such an operation causes the pawl 51 to rotate clockwise in the figure through the power transmission means 4, disengaging the clutch 5.

When the distance between vehicles decreases, the motor 3 may be controlled to repeatedly pull the webbing W in order to send a signal to the occupant. In this case, the clutch 5 is also engaged and disengaged by the same operation as in the case where the webbing W is retracted by the motor 3 and the retracting of the webbing W is stopped by the motor 3. Specifically, as shown in FIGS. 2A and 2B, the driving the motor 3 causes the drive gear 31 to alternately rotate counterclockwise and clockwise in the figure, alternately engaging and disengaging the clutch 5, and alternately bring into a retracted state and a withdrawable state. As a result, the webbing W can be pulled, and withdrawn by the tension produced in the webbing W for an occupant wearing the seat belt. A signal can be sent to the occupant by repeatedly performing this operation.

When the seat belt apparatus 7 of the present invention engages and disengages the clutch 5 as described above, the actuating pin 52 abuts the stopper portion 53 without the pawl 51 contacting with the casing 6, thereby reducing the emanation of abutment noise upon disengagement of the clutch 5 and the discomfort feeling brought to the occupant.

The present invention is not limited to the above-described embodiments. It will be obvious that various changes may be made without departing from the scope of the present invention. For example, the present invention may be applied to a seat belt retractor 1 without a power spring 11, or a seat belt apparatus used in transportation other than vehicle.

What is claimed is:

1. A seat belt retractor comprising:
    a spool for retracting a webbing to restrain an occupant;
    a motor for generating drive torque to rotate the spool;
    a power transmission device for transmitting the drive torque of the motor to the spool;
    a clutch for connecting or disconnecting the power transmission device and the spool; and
    a casing for housing the clutch and the power transmission device,
    wherein the clutch has a pawl rotatably connected to the casing, an actuating pin for rotating the pawl in conjunction with the power transmission device, and a stopper portion for contacting the actuating pin and limiting the rotation of the actuating pin;
    wherein the stopper portion is formed so that the pawl does not contact with a side portion of the casing when the stopper portion contacts with the actuating pin.

2. The seat belt retractor according to claim 1, wherein the stopper portion is a protruding portion formed on the casing, a member disposed on and extending away from the casing, or a rod-like member disposed in the casing.

3. The seat belt retractor according to claim 1, wherein the actuating pin or the stopper portion has a buffer portion on the surface thereof.

4. The seat belt retractor according to claim 3, wherein the buffer portion is made of a material that can be used in a temperature range of −40° C. to 80° C.

5. The seat belt retractor according to claim 1, wherein the power transmission device includes a drive gear and at least one intermediate gear, wherein the drive gear and at least one intermediate gear are interconnected through a gear mesh.

6. A seat belt apparatus comprising:
    a webbing for restraining an occupant;
    a seat belt retractor for retracting the webbing;
    a guide anchor provided on the vehicle body side to guide the webbing;
    a belt anchor for fixing the webbing to the vehicle body side;
    a buckle disposed on the side of the seat; and
    a tongue disposed on the webbing,
    the apparatus restraining the occupant with the webbing in the seat by inserting the tongue into the buckle,
    wherein the seat belt retractor is a seat belt retractor according to any one of claims 1 to 4.

* * * * *